US012670111B2

(12) United States Patent     (10) Patent No.:   US 12,670,111 B2

Li et al.         (45) Date of Patent:     Jun. 30, 2026

(54) EXCEPTION HANDLING SYSTEM AND METHOD, AND DETECTION DEVICE FOR SPACE ENVIRONMENT

(71) Applicant: ZHEJIANG LAB, Hangzhou (CN)

(72) Inventors: Chao Li, Hangzhou (CN); Yixun Luo, Hangzhou (CN); Linghui Chen, Hangzhou (CN); Luqi Gong, Hangzhou (CN); Zhaoliang Wang, Hangzhou (CN); Xinqian Zheng, Hangzhou (CN); Yi Zhang, Hangzhou (CN); Qiang Fu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 19/122,756

(22) PCT Filed: Jan. 24, 2025

(86) PCT No.: PCT/CN2025/074869

§ 371 (c)(1),
(2) Date: Apr. 21, 2025

(87) PCT Pub. No.: WO2026/000984

PCT Pub. Date: Jan. 2, 2026

(65) Prior Publication Data

US 2026/0010499 A1     Jan. 8, 2026

(30) Foreign Application Priority Data

Jun. 24, 2024    (CN) .......................... 202410821665.2

(51) Int. Cl.
    *G06F 13/24*       (2006.01)
(52) U.S. Cl.
    CPC ........ *G06F 13/24* (2013.01); *G06F 2209/481* (2013.01)

(58) Field of Classification Search
    CPC .............................. G06F 13/24; G06F 2209/48
    See application file for complete search history.

(56) References Cited

U.S. PATENT DOCUMENTS 4,506,362 A * 3/1985 Morley ................. G06F 11/106
                                          714/763
4,785,200 A * 11/1988 Huntington ........ H03K 3/35625
                                            377/79

(Continued)

FOREIGN PATENT DOCUMENTS

CN      102521066 A    6/2012
CN      103984630 A    8/2014

(Continued)

OTHER PUBLICATIONS

Zhang Hongwei Yu Qingkui Zhang Dayu Meng Meng Tang Min. "Radiation Effect Test on Large Capacity Flash Memories", Spacecraft Engineering vol. 20 No. 6.Nov. 2011,5 pages.

(Continued)

*Primary Examiner* — Faisal M Zaman

(74) *Attorney, Agent, or Firm* — BSJ & SUN LLC

(57)              ABSTRACT

An exception handling system and method for a space environment, and a detection device are provided. The exception handling system includes: a detection device, an interrupt controller, and a to-be-detected storage device, the to-be-detected storage device includes a statistical unit and registers; the statistical unit is configured to read monitoring data from a specified position of the to-be-detected storage device, generate statistical data based on the monitoring data and reference data written into the specified position in advance, and store the statistical data in the registers; the detection device is configured to read the statistical data from the registers, determine an exception detection result, generate an interrupt signal based on the exception detection result, and send the interrupt signal to the interrupt control- (Continued)

ler; and the interrupt controller is configured to perform an exception handling based on the interrupt signal.

11 Claims, 2 Drawing Sheets

(56) References Cited

U.S. PATENT DOCUMENTS

| | | | | |
|---|---|---|---|---|
| 8,332,722 | B1 | 12/2012 | Vera Rojas et al. | |
| 9,734,032 | B1* | 8/2017 | Ahmad | G06F 11/27 |
| 11,695,539 | B1 | 7/2023 | Modi et al. | |
| 2003/0061535 | A1* | 3/2003 | Bickel | G06F 11/1675 |
| | | | | 714/E11.069 |
| 2003/0188219 | A1* | 10/2003 | DeRuiter | G06F 11/00 |
| | | | | 714/763 |
| 2003/0234430 | A1* | 12/2003 | Friend | G11C 11/4125 |
| | | | | 716/112 |
| 2005/0005203 | A1* | 1/2005 | Czajkowski | G06F 11/1497 |
| | | | | 714/47.1 |
| 2006/0036909 | A1* | 2/2006 | VanBuren | G11C 29/52 |
| | | | | 714/15 |
| 2007/0198892 | A1* | 8/2007 | Ng | G06F 11/1008 |
| | | | | 714/763 |
| 2008/0046603 | A1 | 2/2008 | Kobayashi et al. | |
| 2008/0120500 | A1* | 5/2008 | Kimmery | G06F 11/2025 |
| | | | | 714/E11.018 |
| 2009/0103380 | A1* | 4/2009 | Pekny | G06F 13/4291 |
| | | | | 365/201 |
| 2009/0231771 | A1* | 9/2009 | Bransford | H02H 5/005 |
| | | | | 361/93.1 |
| 2010/0163756 | A1 | 7/2010 | Mcpeak | |
| 2010/0269022 | A1* | 10/2010 | Clark | G06F 9/3867 |
| | | | | 714/764 |
| 2012/0154058 | A1* | 6/2012 | Wood | H03L 7/0995 |
| | | | | 331/34 |
| 2014/0032135 | A1* | 1/2014 | Cannon | H10F 39/804 |
| | | | | 702/36 |
| 2014/0078850 | A1* | 3/2014 | Eguchi | H03K 17/22 |
| | | | | 327/143 |
| 2015/0039967 | A1* | 2/2015 | Romanovskyy | |
| | | | | G11C 11/40626 |
| | | | | 714/764 |
| 2015/0364216 | A1* | 12/2015 | Buck | G11C 7/02 |
| | | | | 250/394 |
| 2016/0049941 | A1* | 2/2016 | How | H03K 19/17728 |
| | | | | 326/38 |
| 2017/0133106 | A1 | 5/2017 | Viswanathan Pillai et al. | |
| 2018/0348722 | A1 | 12/2018 | Ilijic | |
| 2020/0342567 | A1* | 10/2020 | Eric | G06T 3/606 |
| 2021/0158885 | A1* | 5/2021 | Kim | G11C 29/44 |
| 2022/0260735 | A1* | 8/2022 | Iwashita | G06F 11/1004 |
| 2022/0385959 | A1* | 12/2022 | Ozawa | H04N 23/665 |
| 2023/0214292 | A1* | 7/2023 | Pandey | G06F 11/0781 |
| | | | | 714/764 |
| 2024/0276025 | A1* | 8/2024 | Zhu | H04N 19/188 |
| 2024/0362112 | A1* | 10/2024 | Clemen, Jr. | G11C 5/005 |

FOREIGN PATENT DOCUMENTS

| | | | | |
|---|---|---|---|---|
| CN | 106484581 | A | 3/2017 | |
| CN | 108832990 | A | 11/2018 | |
| CN | 109213026 | A * | 1/2019 | ........ G05B 19/0423 |
| CN | 111599402 | A | 8/2020 | |
| CN | 111913469 | A | 11/2020 | |
| CN | 114665977 | A | 6/2022 | |
| CN | 114860495 | A | 8/2022 | |
| CN | 115295039 | A | 11/2022 | |
| CN | 116558835 | A | 8/2023 | |
| CN | 117149531 | A | 12/2023 | |
| CN | 118377645 | A | 7/2024 | |
| KR | 20010036025 | A | 5/2001 | |
| WO | 0070482 | A1 | 11/2000 | |

OTHER PUBLICATIONS

Zhang Qi. "Design and research of orbit single event upset effect tast system for spaceborne DSP and ASIC".China Master's Theses Full-text Database.Engineering Science and Technology II Series vol. 2023, No. 2 Feb. 15, 2023,87 pages.

State Intellectual Property Office of the People's Republic of China, Office Action and Search Report Issued in Application No. 2024108216652, Jul. 26, 2024, 16pages.

State Intellectual Property Office of the People's Republic of China, Notice of Allowance and Search Report Issued in Application No. 2024108216652, Aug. 8, 2024, 8 pages.

* cited by examiner

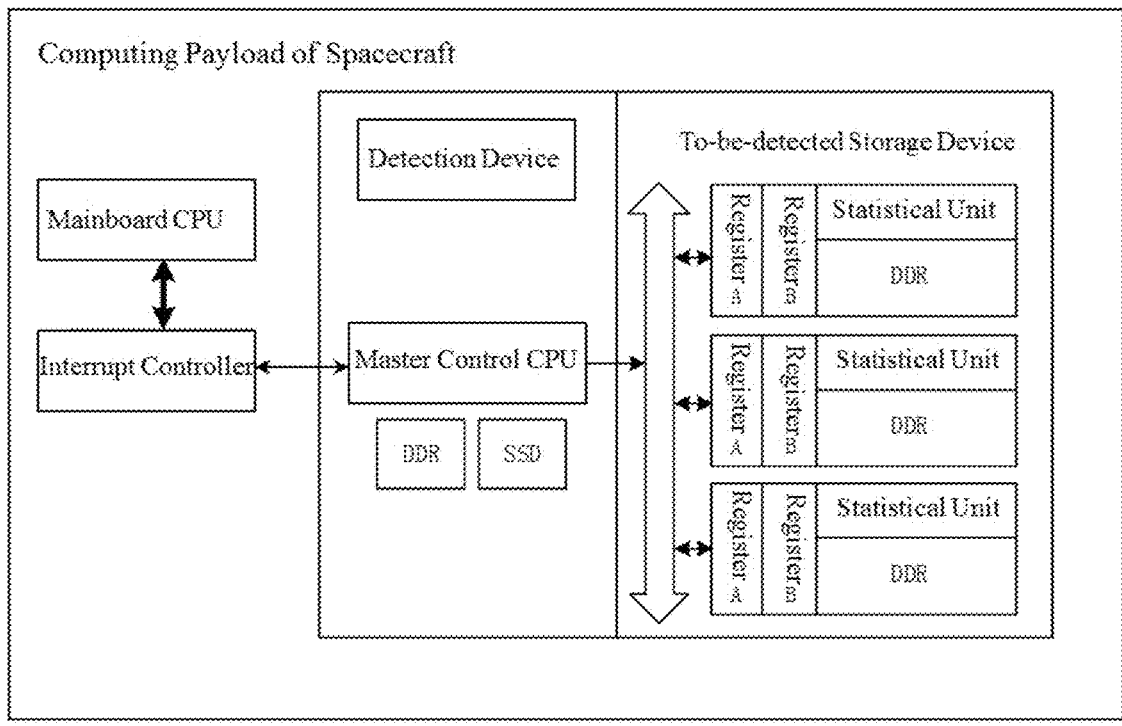

Read, by the detection device, statistical data from at least two registers of the to-be-detected memory device through an internal bus of a spacecraft, where the statistical data are generated and stored in the registers through a statistical unit of the to-be-detected memory device, and the statistical unit is configured to read monitoring data from a specified position of the to-be-detected memory device, generate the statistical data based on the monitoring data and reference data written into the specified position in advance, and store the statistical data in the registers

S202

Determine an exception detection result for the to-be-detected memory device based on the statistical data, where the exception detection result is configured to indicate a severity of a single-event upset occurring in the to-be-detected memory device under an influence of particle radiation in a space environment

S203

Generate an interrupt signal based on the exception detection result, and send the interrupt signal to an interrupt controller, so that the interrupt controller performs an exception handling based on the interrupt signal

FIG. 2

EXCEPTION HANDLING SYSTEM AND METHOD, AND DETECTION DEVICE FOR SPACE ENVIRONMENT

CROSS-REFERENCE TO RELATED APPLICATIONS

The present application is a national stage of international PCT Application No. PCT/CN2025/074869 filed on Jan. 24, 2025, which claims the benefit of priority to Chinese Application No. 202410821665.2, filed on Jun. 24, 2024, both of which are incorporated herein by reference in their entireties.

TECHNICAL FIELD

The present disclosure relates to, but is not limited to, the field of aerospace technologies, and in particular, to an exception handling system and method, and detection device for a space environment.

BACKGROUND

In a space environment, radiation, including radiation from cosmic rays and energetic particles, may have an impact on storage devices, resulting in a single-event upset. The single-event upset refers to a behavior in an electronic device (such as a storage device, an integrated circuit, etc.) that a state inside a storage cell (such as one bit in a storage) is flipped from an original state of 0 or 1 to another state due to the influence of cosmic rays. This flip may result in data errors or corruption, affecting the proper operation of the device. In spacecraft (such as satellites, space platforms, space shuttles, etc.) and other devices that operate in space for a long time, the reliability and stability of data are crucial. Thus, the severity of the single-event upset cannot be negligible.

At present, metal masks or metal shields are usually used in the design of storage devices in the spacecraft to reduce the influence of cosmic rays on the storage, but the single-event upset caused by radiation cannot be completely eliminated by these measures, and the normal operation of the aerospace device is likely to be affected once the single-event upset occurs in the aerospace device.

SUMMARY

The present disclosure provides an exception handling system for a space environment, the exception handling system includes: a detection device, an interrupt controller, and a to-be-detected storage device, the to-be-detected storage device and the detection device are deployed on a computing payload of a spacecraft, and the to-be-detected storage device includes a statistical unit and at least two registers; the statistical unit is configured to read monitoring data from a specified position of the to-be-detected storage device, generate statistical data based on the monitoring data and reference data written into the specified position in advance by the statistical unit, and store the statistical data in the at least two registers; the reference data includes data with a plurality of bits that have specified values, and the statistical unit is configured to determine a number of bits that do not have the specified values in the monitoring data, and generate the statistical data based on the number of bits that do not have the specified values in the monitoring data and a total number of bits in the monitoring data; the detection device is configured to read the statistical data from the at least two registers through an internal bus of the spacecraft, determine an exception detection result for the to-be-detected storage device based on the statistical data, generate an interrupt signal based on the exception detection result, and send the interrupt signal to the interrupt controller, wherein the exception detection result is configured to indicate a severity of a single-event upset in the to-be-detected storage device under an influence of particle radiation in a space environment; and the interrupt controller is configured to perform and exception handling based on the interrupt signal.

Optionally, the detection device includes a master control central processing unit (CPU) and a basic storage device; and a radiation resistant material is provided on outside of the master control CPU and the basic storage device.

Optionally, the detection device is specifically configured to: determine whether the statistical data stored in the at least two registers are consistent; in response to determining that the statistical data stored in the at least two registers are consistent, determine the exception detection result for the to-be-detected storage device based on the statistical data; and in response to determining that the statistical data stored in the at least two registers are inconsistent, re-read monitoring data from the specified position, and re-generate statistical data based on the re-read monitoring data and the reference data.

Optionally, for each of the at least two registers, the register stores a plurality of statistical data that are generated by the statistical unit based on the monitoring data read from the specified position for multiple times and the reference data; and the detection device is specifically configured to: determine whether the statistical data generated by the statistical unit for a latest preset times are consistent; in response to determining that the plurality of statistical data generated by the statistical unit for the latest preset number of times are consistent, determine the exception detection result for the to-be-detected storage device based on the plurality of statistical data; and in response to determining that the plurality of statistical data generated by the statistical unit for the latest preset number of times are inconsistent, re-read monitoring data from the specified position, and re-generate statistical data based on the re-read monitoring data and the reference data.

Optionally, the interrupt controller is configured to trigger, based on the interrupt signal, a mainboard CPU of the computing payload to perform an interrupt response, so that the mainboard CPU performs the exception handling based on the interrupt signal.

The present disclosure provides an exception handling method for a space environment, and a detection device, an interrupt controller and a to-be-detected storage device are provided in a spacecraft. The method includes: reading, by the detection device, statistical data from at least two registers of the to-be-detected storage device through an internal bus of the spacecraft, wherein the statistical data are generated and stored in the at least two registers through a statistical unit of the to-be-detected storage device, and the statistical unit is configured to read monitoring data from a specified position of the to-be-detected storage device, generate the statistical data based on the monitoring data and reference data written into the specified position in advance, and store the statistical data in the at least two registers, and wherein the reference data includes data with a plurality of bits that have specified values, and after the statistical unit determines a number of bits that do not have the specified values in the monitoring data, the statistical data is generated based on the number of bits that do not have the specified values in the monitoring data and a total number of bits in the monitoring data; determining an exception detection result for the to-be-detected storage device based on the statistical data, wherein the exception detection result is configured to indicate a severity of a single-event upset in the to-be-detected storage device under an influence of particle radiation in a space environment; and generating an interrupt signal based on the exception detection result, and sending the interrupt signal to the interrupt controller, so that the interrupt controller performs an exception handling based on the interrupt signal.

Optionally, before determining the exception detection result for the to-be-detected storage device based on the statistical data, the method further includes: determining whether the statistical data stored in the at least two registers are consistent; and determining the exception detection result for the to-be-detected storage device based on the statistical data specifically includes: in response to determining that the statistical data stored in the at least two registers are consistent, determining the exception detection result for the to-be-detected storage device based on the statistical data; and in response to determining that the statistical data stored in the at least two registers are inconsistent, re-reading monitoring data from the specified position, and re-generating statistical data based on the re-read monitoring data and the reference data.

Optionally, for each of the at least two registers, the register stores a plurality of statistical data that are generated by the statistical unit based on the monitoring data read from the specified position for multiple times and the reference data; before determining the exception detection result for the to-be-detected storage device based on the statistical data, the method further includes: determining whether a plurality of statistical data generated by the statistical unit for a latest preset number of times are consistent; and determining the exception detection result for the to-be-detected storage device based on the statistical data specifically includes: in response to determining that the plurality of statistical data generated by the statistical unit for the latest preset number of times are consistent, determining the exception detection result for the to-be-detected storage device based on the plurality of statistical data; and in response to determining that the plurality of statistical data generated by the statistical unit for the latest preset number of times are inconsistent, re-reading monitoring data from the specified position, and re-generating statistical data based on the re-read monitoring data and the reference data.

The present disclosure provides a computer-readable storage medium, the computer-readable storage medium stores a computer program, and when the computer program is executed by a processor, the above exception handling method is implemented.

The present disclosure provides a detection device, including a memory, a processor, and a computer program stored in the memory and executable on the processor, wherein the processor, when executing the program, implements the above exception handling method.

BRIEF DESCRIPTION OF DRAWINGS

The accompanying drawings illustrated herein are intended to provide a further understanding of the present disclosure and constitute a part of this specification, and exemplary embodiments of the present disclosure, together with the description thereof, serve to explain the present disclosure, and are not intended to limit the present disclosure.

FIG. 1 is a schematic diagram of an exception handling system for a space environment according to an embodiment of the present disclosure.

FIG. 2 is a flowchart of an exception handling method according to an embodiment of the present disclosure.

DETAILED DESCRIPTION

Figure 3:
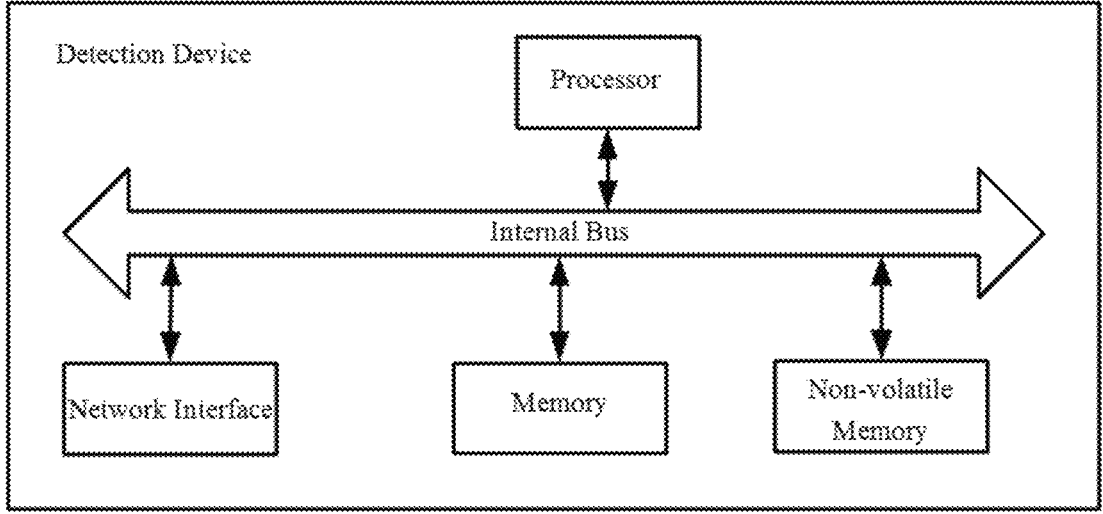
FIG. 3 is a schematic diagram of a detection device of FIG. 1 according to an embodiment of the disclosure.

In order to illustrate the objectives, technical solutions and advantages of the present disclosure, the technical solutions of the present disclosure will be clearly and completely described below in conjunction with specific embodiments of the present disclosure and corresponding drawings. Apparently, the described embodiments are merely some rather than all of the embodiments of the present disclosure. All other embodiments, which are obtained by a person of ordinary skill in the art based on the embodiments of the present disclosure without creative efforts, shall fall within the protection scope of the present disclosure.

In order to deal with the single-event upset, some measures are usually taken to protect storage devices in a space environment. By using error detection and error checking and correcting (ECC), data errors caused by the single-event upset in storage can be detected and corrected. By adding a metal mask or metal shield to the design of the storage device, the impact of cosmic rays on the storage can be relieved. However, these solutions still have some shortcomings. Implementing solutions such as ECC or metal shielding may increase cost, and especially in the case of mass production, may affect overall cost-effectiveness. Moreover, solutions such as metal shielding may increase the weight and size of the device, which may be detrimental to the design of the spacecraft for space tasks. However, in fact, these solutions cannot completely eliminate the single-event upset caused by radiation, which makes the detection and pre-warning of the single-event upset particularly important. Therefore, it is an urgent problem to be solved how to detect and pre-warn of the single-event upset, thereby handling the abnormal situation of the single-event upset of the spacecraft in time, avoiding the risk caused by the data error or corruption, and ensuring the normal operation of aerospace device.

The technical solutions according to embodiments of the present disclosure are described in detail below with reference to the accompanying drawings.

FIG. 1 is a schematic diagram of an exception handling system for a space environment according to an embodiment of the present disclosure, and the exception handling system includes a detection device, an interrupt controller, and a to-be-detected storage device.

The to-be-detected storage device, the interrupt controller, and the detection device may all be deployed on a computing payload of a spacecraft (e.g., a satellite, a space platform, or a space shuttle). In embodiments according to the present disclosure, the computing payload may refer to a hardware device mounted on the spacecraft, such as a computer, a camera, a router, etc.

The detection device includes a master control central processing unit (CPU) and a basic storage device, and the basic storage device may include a solid state disk (SSD) and a double data rate (DDR) storage. The external of the master control CPU and basic storage device of the detection device are provided with a radiation-resistant material for protection, thereby reducing the risk of affecting the exception detection result due to the single-event upset occurring in the detection device.

In the present disclosure, the to-be-detected storage device may include one or more of SSD, DDR, and a video storage of a graphics processing unit (GPU). However, the to-be-detected storage device may further include other storage devices, which are not specifically limited in the present disclosure. In practical applications, the above to-be-detected storage device may also be protected by the radiation-resistant material, but the single-event upset cannot be completely avoided.

For each storage device, the storage device may include a statistical unit and at least two registers. The statistical unit may send a write request to the to-be-detected storage device in advance, so as to write reference data to a specified position in the to-be-detected storage device for storage.

During the operation of the spacecraft, the statistical unit may send a data read request to the to-be-detected storage device at a preset time interval, so as to read monitoring data from the specified position of the to-be-detected storage device, and then the statistical unit may generate statistical data based on the read monitoring data and the reference data that has been written into the specified position in advance by the statistical unit, and store the statistical data in at least two registers.

In practical applications, the reference data includes the data with a plurality of bits that have specified values (such as 0 or 1). After the statistical unit reads the monitoring data from the specified position of the to-be-detected storage device, the statistical unit may determine the number of bits that do not have the specified values (i.e., the number of bits that have changed) in the monitoring data, and then determine the statistical data according to the number of bits that do not have the specified values in the monitoring data and the total number of bits in the monitoring data.

For example, when the reference data refer to the data in which the values of all bits are 0, after reading the monitoring data, the statistical unit may calculate a ratio of the number of non-zero-bits (i.e., bits with values of 1) to the total number of bits in the monitoring data, thereby obtaining the statistical data.

For another example, when the reference data refer to the data in which the values of all bits are 1, after reading the monitoring data, the statistical unit may calculate a ratio of the number of zero-bits (i.e., bits with values of 0) to the total number of bits in the monitoring data, to obtain the statistical data.

However, the reference data may also have a plurality of random numbers, and after reading the monitoring data, the statistical unit may compare the monitoring data with the reference data to determine the number of flipped bits, and determine the statistical data according to the number of flipped bits and the total number of bits.

In a process of detecting the to-be-detected storage device, the detection device may read the statistical data from the registers through an internal bus of the spacecraft, and determine an exception detection result for the to-be-detected storage device based on the statistical data. The exception detection result is used to indicate a severity of the single-event upset in the to-be-detected storage device under the influence of particle radiation in a space environment, which may be determined according to the proportion of flipped bits in statistical data.

In practical application, the detection device may determine two exception detection results based on the statistical data, that is, the exception has an impact and the exception has no impact. Pre-warning and handling measures will be taken when the exception has an impact, and no pre-warning and handling measures will be taken when the exception has no impact.

When the proportion of the flipped bits is greater than a preset threshold, it indicates that the single-event upset situation is relatively serious, so as to obtain a detection result indicating that the exception has an impact; and when the proportion of the flipped bits is less than the preset threshold, it indicates that the single-event upset situation is not serious, so as to obtain a detection result indicating that the exception has no impact. The above preset threshold may be adjusted according to actual conditions, and is not specifically limited in the present disclosure.

In addition, the detection device may also classify the severity of the single-event upset situation based on the proportion of the flipped bits in the statistical data, so as to obtain different levels of exception detection results, and then generate different interrupt signals based on the different levels of exception detection results, and then pre-warning or handling measures may be performed by a mainboard CPU of the computing payload.

For example, the detection device may classify a detection result corresponding to statistical data in which the proportion of flipped bits ranges from 0% to 20% as a low risk, classify a detection result corresponding to statistical data in which the proportion of flipped bits ranges from 20% to 40% as a medium risk, classify a detection result corresponding to statistical data in which the proportion of flipped bits ranges from 40% to 60% as a high risk, and classify a detection result corresponding to statistical data in which the proportion of flipped bits is more than 60% as an extremely high risk.

For an exception detection result with a low risk, the mainboard CPU can improve data redundancy and error correction code (ECC), so as to increase the data redundancy, and enhance an error detection and correction capability, thereby dealing with possible data corruption or error; for an exception detection result with a medium risk, the mainboard CPU can reduce a clock frequency of a service process, reduce or stop a service operation, and reduce write and read operations of the service process on the storage device by reducing a running frequency of the device, so as to reduce a risk of a data error of the service process; for an exception detection result with a high risk, the mainboard CPU can perform master-standby switching and system restart, that is, it can switch to a standby system or initiate a device restart, thereby ensuring that the system can quickly recover to a reliable state after the single-event upset; and for an exception detection result with an extremely high risk, the mainboard CPU can send a pre-warning signal to a ground terminal, and remind that manual intervention and check need to be performed by sending a pre-warning signal to a system operator.

Further, the statistical data may perform multiple-time calculations, comparisons and checks, and re-calculate automatically when the results of the multiple times of calculation are inconsistent, thereby reducing the influence of the single-event upset occurring in the statistical unit on the statistical result.

Specifically, for each of the registers, the register stores a plurality of statistical data, which are generated by the statistical unit for a plurality of times according to the monitoring data read from the specified position and the reference data. Before determining the exception detection result, the detection device may determine whether respective statistical data generated by the statistical unit for the latest preset number of times are consistent, and if the respective statistical data are consistent, the detection device may determine the exception detection result for the to-be-detected storage device according to the statistical data; and if the respective statistical data are inconsistent, the monitoring data are re-read from the specified position, statistical data are re-generated for multiple times according to the re-read monitoring data and the reference data, and then the consistency check is performed on the statistical data re-generated for multiple times again, and when the check succeeds, the exception detection result is determined based on the statistical data that pass the check.

In addition, in order to reduce the probability of single-event upset of the calculation result itself, the calculation result for the single-event upset has a plurality of backups in each register to be detected. As shown in FIG. 1, a register A and a register B are configured to store statistical results and backups.

On this basis, the statistical data may adopt calculation results that have multiple backups, and when the master control CPU reads the results from various registers (register A and register B), it is necessary to read each of the calculation results and the corresponding backup, and check whether the data are consistent, thereby reducing the influence of the single-event upset in the register where the statistical results are stored on the statistical results.

Specifically, before determining the exception detection result, the detection device may determine whether statistical data stored in the at least two registers are consistent. If the statistical data stored in the at least two registers are consistent, an exception detection result for the to-be-detected storage device is determined according to the statistical data; and if the statistical data stored in the at least two registers are inconsistent, the monitoring data are re-read from the specified position, statistical data are re-generated according to the re-read monitoring data and the reference data, and then the consistency check is performed on the re-generated statistical data in each of the registers again, and when the check succeeds, the exception detection result is determined based on the statistical data that pass the check.

That is, when the statistical data in each register are inconsistent, and/or the statistical data, which are recently generated for multiple times, in any one register are inconsistent, it indicates that the statistical data are inaccurate. In this case, it is necessary to re-acquire the statistical data and determine the exception detection result after the check succeeds.

After determining the exception detection result, the detection device may generate an interrupt signal based on the exception detection result, and send the interrupt signal to the interrupt controller, where different exception detection results may correspond to different interrupt signals.

It should be noted that the above operations performed by the detection device may all be completed by the master control CPU of the detection device. That is, the master control CPU of the detection device reads the statistical data from the register, determines the exception detection result for the to-be-detected storage device according to the statistical data, generates the interrupt signal based on the exception detection result, and sends the interrupt signal to the interrupt controller.

After receiving the interrupt signal, the interrupt controller may perform exception handling based on the interrupt signal.

Specifically, the interrupt controller may be used as an interrupt agent, and when it is detected that a pin receives an interrupt signal sent by the master control CPU, the mainboard CPU of the computing payload is triggered to perform an interrupt response.

The mainboard CPU may execute an interrupt logic according to a pre-registered interrupt processing program, for example, pre-warning operations such as sending an exception handling notification, log recording, emergency operations such as power-off; the interrupt controller may also be directly connected to an NMI (Nonmaskable Interrupt) pin of the mainboard CPU or cause the power supply to enter a sleep mode, so as to perform an emergency interrupt, so that the mainboard CPU directly enters a power-down mode or a sleep mode, thereby protecting calculation task results from interference in a single-particle high-radiation intensity environment.

By monitoring the interrupt controller, the mainboard CPU may perform pre-warning or trigger safety measures according to the interrupt level when receiving the interrupt signal. Processing measures taken for different interrupt levels (or exception detection results) have been described above, and will not be repeated here.

Further, the present disclosure also provides an exception handling method applied to the above detection device, as shown in FIG. 2.

FIG. 2 is a schematic diagram of an exception handling method provided in the present disclosure, which includes the following steps S201 to S203.

In the step S201, the detection device reads statistical data from at least two registers of a to-be-detected storage device through an internal bus of a spacecraft, where the statistical data are generated and stored in the registers through a statistical unit of the to-be-detected storage device, and the statistical unit is configured to read monitoring data from a specified position of the to-be-detected storage device, generate the statistical data based on the monitoring data and reference data written into the specified position in advance, and store the statistical data in the registers.

In the step S202, an exception detection result for the to-be-detected storage device is determined based on the statistical data, where the exception detection result is configured to indicate a severity of a single-event upset occurring in the to-be-detected storage device under an influence of particle radiation in a space environment.

In step S203, an interrupt signal is generated based on the exception detection result, and the interrupt signal is sent to an interrupt controller, so that the interrupt controller performs an exception handling based on the interrupt signal.

It can be seen from the above method that, in this solution, the statistical data can be calculated by the statistical unit inside the to-be-detected storage device. Since the statistical unit and the detection device are isolated from each other, the influence on the statistical data caused by the single-event upset in the detection device is avoided, and the obtained exception detection result is more accurate, so that handling or pre-warning can be performed in time on the single-event upset of the to-be-detected storage device based on the exception detection result, thereby avoiding the interference and damage to the data in the spacecraft caused by the single-event upset, and further ensuring the safe operation of the spacecraft. In the embodiments of the present disclosure, the statistical unit may be implemented by an embedded CPU, a customized SOC (System on Chip), a field-programmable gate array (FPGA), or the like.

The present disclosure further provides a schematic structural diagram of a detection device corresponding to FIG. 2 and shown in FIG. 3. As shown in FIG. 3, in terms of hardware, the detection device includes a processor, an internal bus, a network interface, a storage, and a non-volatile storage. However, the detection device may further include hardware required by other services. The processor reads a corresponding computer program from the non-volatile storage into the storage and then runs the computer program, to implement the exception handling method as described in FIG. 2. However, in addition to software implementations, the present disclosure does not exclude other implementations, such as logic devices or a combination of software and hardware, etc., that is, execution bodies of the following processing flows is not limited to various logic units, and may also be hardware or logic devices.

The improvement of a technology can be clearly distinguished as a hardware improvement (for example, the improvement of the circuit structure of diodes, transistors, switches, or the like) or a software improvement (the improvement of the method flow). However, with the development of technology, the improvement of many methods and processes can be regarded as the direct improvement of the hardware circuit structure. Almost all designers obtain the corresponding hardware circuit structure by programming the improved method flow into the hardware circuit. Therefore, it cannot be said that the improvement of a method flow cannot be realized by hardware entity modules. For example, a programmable logic device (PLD) (such as Field Programmable Gate Array (FPGA)) is such an integrated circuit, and its logic function is determined by the user programming the device. Designers program to "integrate" a digital system on a PLD, without the need to ask chip manufacturers to design and make special integrated circuit chips. Moreover, nowadays, instead of making integrated circuit chips by hand, this programming is mostly realized by using "logic compiler" software, which is similar to the software compiler used in program development and writing, and the original codes before compilation must be written in a specific programming language, which is called Hardware Description Language (HDL). There is not only one kind of HDL, but many kinds, for example ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. At present, VHDL (Very-High-Speed Integrated Circuit Hardware Description Language) and Verilog are most commonly used. It should also be clear to those skilled in the art that the hardware circuit for realizing the logical method flow can be easily obtained only by slightly programming the method flow in the above-mentioned hardware description languages and programming it into the integrated circuit.

The controller can be implemented in any suitable way, for example, the controller can take the form of a microprocessor or a processor and a computer-readable medium storing computer-readable program code (for example, software or firmware) executable by the (micro) processor, a logic gate, a switch, an application specific integrated circuit (ASIC), a programmable logic controller and an embedded microcontroller. Examples of the controller include but are not limited to the following microcontrollers: ARC 625D, Atmel AT91SAM, Microchip PIC18F26K20 and Silicone Labs C8051F320. The memory controller can also be implemented as a part of the control logic of the memory. Those skilled in the art also know that it is entirely possible to make the controller realize the same function in the form of a logic gate, a switch, an application specific integrated circuit, a programmable logic controller and an embedded microcontroller by logically programming the method steps, in addition to implementing the controller by way of pure computer-readable program codes. Therefore, this controller can be regarded as a hardware component, and the devices for implementing various functions included therein can also be regarded as structures in the hardware component. Alternatively, the means for realizing various functions can be regarded as both a software module for implementing the method and a structure within a hardware component.

The system, device, modules or units set forth in the above embodiments can be implemented by computer chips or entities, or by products with certain functions. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device or a combination of any of these devices.

For the convenience of description, when describing the above devices, the functions are divided into various units and described separately. Of course, the functions of each unit can be implemented in the same software and/or hardware when carrying out the present disclosure.

It should be appreciated by those skilled in the art that embodiments of the present disclosure can be provided as methods, systems, or computer program products. Therefore, the present disclosure can take the form of an entirely hardware embodiment, an entirely software embodiment, or an embodiment combining software and hardware aspects. Moreover, the present disclosure can take the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be appreciated that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, an embedded processor or other programmable data processing apparatus to produce a machine, such that the instructions which are executed by the processor of the computer or other programmable data processing apparatus produce devices for implementing the functions specified in one or more flows in the flowchart and/or one or more blocks in the block diagram.

These computer program instructions may also be stored in a computer-readable memory that can direct a computer or other programmable data processing apparatus to function in a particular manner, such that the instructions stored in the computer-readable memory produce an article of manufacture including instruction devices that implement the functions specified in flow or flows and/or block or blocks of the block diagram.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in one or more flows in the flowchart and/or one or more blocks in the block diagram.

In a typical configuration, a computing device includes one or more processors (CPU), input/output interfaces, network interfaces, and memories.

The memory may include non-permanent memory, random access memory (RAM) and/or nonvolatile memory in computer-readable media, such as read-only memory (ROM) or flash memory (flash RAM). Memory is an example of a computer-readable medium.

Computer-readable media, including permanent and non-permanent, removable and non-removable media, can store information by any method or technology. Information can be computer-readable instructions, data structures, modules of programs or other data. Examples of storage media for computers including but not limited to, phase-change memory (PRAM), static random access, memory (SRAM), dynamic random access memory (DRAM), other types of random access memories (RAM), read-only memory (ROM), electrically erasable programmable read-only memory (EEPROM), flash memory or other memory technologies, compact disc read-only memory (CD-ROM), digital versatile disc (DVD) or other optical storages, and magnetic cassettes, magnetic tape magnetic disk storage or other magnetic storage devices, or any other non-transmission media, can be used to store information that can be accessed by computing devices. According to the definition herein, computer-readable media does not include transitory media, such as modulated data signals and carrier waves.

It should also be noted that the terms "including", "comprising" or any other variation thereof are intended to cover non-exclusive inclusion, so that a process, method, commodity or apparatus including a series of elements includes not only those elements, but also other elements not explicitly listed, or elements inherent to such process, method, commodity or apparatus. Without more restrictions, an element defined by the phrase "including one" does not exclude the existence of other identical elements in the process, method, commodity or apparatus including the element.

It should be appreciated by those skilled in the art that embodiments of the present disclosure can be provided as methods, systems or computer program products. Therefore, the present disclosure can take the form of an entirely hardware embodiment, an entirely software embodiment or an embodiment combining software and hardware aspects. Moreover, the present disclosure can take the form of a computer program product implemented on one or more computer-usable storage media (including but not limited to disk storage, CD-ROM, optical storage, etc.) containing computer-usable program codes.

The present disclosure may be described in the general context of computer-executable instructions, such as program modules, being executed by a computer. Generally, program modules include routines, programs, objects, components, data structures and the like that perform particular tasks or implement particular abstract data types. The present disclosure may also be practiced in distributed computing environments where tasks are performed by remote processing devices that are connected through a communication network. In a distributed computing environment, program modules may be located in local and remote computer storage media including storage devices.

Each of the embodiments in the present disclosure is described in a progressive way, and reference may be made between the embodiments for the same and similar parts. Each embodiment focuses on the differences from other embodiments. Especially, for the system embodiment, since it is basically similar to the method embodiment, the description is relatively simple, and the relevant points can only be found in part of the description of the method embodiment.

The above are merely embodiments of the present disclosure, but not intended to limit the present disclosure. Various modifications and variations may be made for those skilled in the art. Any modification, equivalent substitution, improvement and the like made within the spirit and principle of the present disclosure shall be included in the scope of the claims of the present disclosure.

The invention claimed is:

1. An exception handling system for a space environment, comprising a detection device, an interrupt controller, and a to-be-detected storage device, wherein the to-be-detected storage device, the interrupt controller, and the detection device are deployed on a computing payload of a spacecraft, and the to-be-detected storage device comprises a statistical unit and at least two registers;

the statistical unit is configured to read monitoring data from a specified position of the to-be-detected storage device, generate statistical data based on the monitoring data and reference data written into the specified position in advance by the statistical unit, and store the statistical data in the at least two registers, wherein the reference data comprise data with a plurality of bits that have specified values, and the statistical unit is configured to determine a number of bits that do not have the specified values in the monitoring data, and generate the statistical data based on the number of bits that do not have the specified values in the monitoring data and a total number of bits in the monitoring data;

the detection device is configured to read the statistical data from the at least two registers through an internal bus of the spacecraft, determine an exception detection result for the to-be-detected storage device based on the statistical data, generate an interrupt signal based on the exception detection result, and send the interrupt signal to the interrupt controller, wherein the exception detection result is configured to indicate a severity of a single-event upset in the to-be-detected storage device under an influence of particle radiation in a space environment; and the interrupt controller is configured to perform an exception handling based on the interrupt signal, wherein the detection device is configured to:

determine whether the statistical data stored in the at least two registers are consistent;

in response to determining that the statistical data stored in the at least two registers are consistent, determine the exception detection result for the to-be-detected storage device based on the statistical data; and in response to determining that the statistical data stored in the at least two registers are inconsistent, re-read monitoring data from the specified position, and re-generate statistical data based on the re-read monitoring data and the reference data.

2. The exception handling system according to claim 1, wherein the detection device comprises a master control central processing unit (CPU) and a basic storage device; and a radiation resistant material is provided on the outside of the master control CPU and the basic storage device.

3. The exception handling system according to claim 1, wherein for each of the at least two registers, the register stores a plurality of statistical data that are generated by the statistical unit based on the monitoring data read from the specified position for multiple times and the reference data; and the detection device is configured to:

determine whether a plurality of statistical data generated by the statistical unit for a latest preset number of times are consistent;

in response to determining that the plurality of statistical data generated by the statistical unit for the latest preset number of times are consistent, determine the exception detection result for the to-be-detected storage device based on the plurality of statistical data; and in response to determining that the plurality of statistical data generated by the statistical unit for the latest preset number of times are inconsistent, re-read monitoring data from the specified position, and re-generate statistical data based on the re-read monitoring data and the reference data.

4. The exception handling system according to claim 1, wherein the interrupt controller is configured to trigger, based on the interrupt signal, a mainboard CPU of the computing payload to perform an interrupt response, so that the mainboard CPU performs the exception handling based on the interrupt signal.

5. An exception handling method for a space environment, wherein a detection device, an interrupt controller and a to-be-detected storage device are provided in a spacecraft, and the exception handling method comprising:

reading, by the detection device, statistical data from at least two registers of the to-be-detected storage device through an internal bus of the spacecraft, wherein the statistical data are generated and stored in the at least two registers through a statistical unit of the to-be-detected storage device, and the statistical unit is configured to read monitoring data from a specified position of the to-be-detected storage device, generate the statistical data based on the monitoring data and reference data written into the specified position in advance, and store the statistical data in the at least two registers; and wherein the reference data comprises data with a plurality of bits that have specified values, and after the statistical unit determines a number of bits that do not have the specified values in the monitoring data, the statistical data is generated based on the number of bits that do not have the specified values in the monitoring data and a total number of bits in the monitoring data;

determining an exception detection result for the to-be-detected storage device based on the statistical data, wherein the exception detection result is configured to indicate a severity of a single-event upset in the to-be-detected storage device under an influence of particle radiation in a space environment; and generating an interrupt signal based on the exception detection result, and sending the interrupt signal to the interrupt controller, so that the interrupt controller performs an exception handling based on the interrupt signal, wherein before determining the exception detection result for the to-be-detected storage device based on the statistical data, the method further comprising:

determining whether the statistical data stored in the at least two registers are consistent; and the determining the exception detection result for the to-be-detected storage device based on the statistical data comprises:

in response to determining that the statistical data stored in the at least two registers are consistent, determining the exception detection result for the to-be-detected storage device based on the statistical data; and in response to determining that the statistical data stored in the at least two registers are inconsistent, re-reading monitoring data from the specified position, and re-generating statistical data based on the re-read monitoring data and the reference data.

6. The method according to claim 5, wherein for each of the at least two registers, the register stores a plurality of statistical data that are generated by the statistical unit based on the monitoring data read from the specified position for multiple times and the reference data;

before determining the exception detection result for the to-be-detected storage device based on the statistical data, the method further comprising:

determining whether a plurality of statistical data generated by the statistical unit for a latest preset number of times are consistent; and the determining the exception detection result for the to-be-detected storage device based on the statistical data comprises:

in response to determining that the plurality of statistical data generated by the statistical unit for the latest preset number of times are consistent, determining the exception detection result for the to-be-detected storage device based on the plurality of statistical data; and in response to determining that the plurality of statistical data generated by the statistical unit for the latest preset number of times are inconsistent, re-reading monitoring data from the specified position, and re-generating statistical data based on the re-read monitoring data and the reference data.

7. A non-transitory computer-readable storage medium, wherein the computer-readable storage medium stores a computer program, and when the computer program is executed by a processor, the exception handling method according to claim 5 is implemented.

8. A detection device, comprising a memory, a processor, and a computer program stored in the memory and executable on the processor, wherein the processor, when executing the program, implements the exception handling method according to claim 5.

9. The non-transitory computer-readable storage medium according to claim 7, wherein for each of the at least two registers, the register stores a plurality of statistical data that are generated by the statistical unit based on the monitoring data read from the specified position for multiple times and the reference data;

before determining the exception detection result for the to-be-detected storage device based on the statistical data, the method further comprising:

determining whether a plurality of statistical data generated by the statistical unit for a latest preset number of times are consistent; and the determining the exception detection result for the to-be-detected storage device based on the statistical data comprises:

in response to determining that the plurality of statistical data generated by the statistical unit for the latest preset number of times are consistent, determining the exception detection result for the to-be-detected storage device based on the plurality of statistical data; and in response to determining that the plurality of statistical data generated by the statistical unit for the latest preset number of times are inconsistent, re-reading monitoring data from the specified position, and re-generating statistical data based on the re-read monitoring data and the reference data.

10. The detection device according to claim 8, wherein for each of the at least two registers, the register stores a plurality of statistical data that are generated by the statistical unit based on the monitoring data read from the specified position for multiple times and the reference data;

before determining the exception detection result for the to-be-detected storage device based on the statistical data, the method further comprising:

determining whether a plurality of statistical data generated by the statistical unit for a latest preset number of times are consistent; and the determining the exception detection result for the to-be-detected storage device based on the statistical data comprises:

in response to determining that the plurality of statistical data generated by the statistical unit for the latest preset number of times are consistent, determining the exception detection result for the to-be-detected storage device based on the plurality of statistical data; and in response to determining that the plurality of statistical data generated by the statistical unit for the latest preset number of times are inconsistent, re-reading monitoring data from the specified position, and re-generating statistical data based on the re-read monitoring data and the reference data.

11. An exception handling system for a space environment, comprising a detection device, an interrupt controller, and a to-be-detected storage device, wherein the to-be-detected storage device, the interrupt controller, and the detection device are deployed on a computing payload of a spacecraft, and the to-be-detected storage device comprises a statistical unit and at least two registers;

the statistical unit is configured to read monitoring data from a specified position of the to-be-detected storage device, generate statistical data based on the monitoring data and reference data written into the specified position in advance by the statistical unit, and store the statistical data in the at least two registers, wherein the reference data comprise data with a plurality of bits that have specified values, and the statistical unit is configured to determine a number of bits that do not have the specified values in the monitoring data, and generate the statistical data based on the number of bits that do not have the specified values in the monitoring data and a total number of bits in the monitoring data;

the detection device is configured to read the statistical data from the at least two registers through an internal bus of the spacecraft, determine an exception detection result for the to-be-detected storage device based on the statistical data, generate an interrupt signal based on the exception detection result, and send the interrupt signal to the interrupt controller, wherein the exception detection result is configured to indicate a severity of a single-event upset in the to-be-detected storage device under an influence of particle radiation in a space environment; and the interrupt controller is configured to perform an exception handling based on the interrupt signal, wherein for each of the at least two registers, the register stores a plurality of statistical data that are generated by the statistical unit based on the monitoring data read from the specified position for multiple times and the reference data; and the detection device is configured to:

determine whether a plurality of statistical data generated by the statistical unit for a latest preset number of times are consistent;

in response to determining that the plurality of statistical data generated by the statistical unit for the latest preset number of times are consistent, determine the exception detection result for the to-be-detected storage device based on the plurality of statistical data; and in response to determining that the plurality of statistical data generated by the statistical unit for the latest preset number of times are inconsistent, re-read monitoring data from the specified position, and re-generate statistical data based on the re-read monitoring data and the reference data.

* * * * *